(12) United States Patent
Schäfer et al.

(10) Patent No.: US 7,383,749 B2
(45) Date of Patent: Jun. 10, 2008

(54) TWIN-CLUTCH TRANSMISSION FOR A MOTOR VEHICLE

(75) Inventors: Michael Schäfer, Gifhorn (DE);
Wolfgang Schreiber, Isenbüttel (DE);
Fritz Blumenstein, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/483,315

(22) Filed: Jul. 7, 2006

(65) Prior Publication Data
US 2006/0266144 A1  Nov. 30, 2006

Related U.S. Application Data

(63) Continuation of application No. PCT/EP2005/000051, filed on Jan. 6, 2005.

(30) Foreign Application Priority Data
Jan. 7, 2004 (DE) ............... 10 2004 001 278

(51) Int. Cl.
*F16H 3/22* (2006.01)
*F16H 3/08* (2006.01)

(52) U.S. Cl. ..................... 74/340; 74/330

(58) Field of Classification Search .......... 74/329, 74/330, 331, 340
See application file for complete search history.

(56) References Cited

U.S. PATENT DOCUMENTS 3,589,483 A * 6/1971 Smith .................. 192/3.52
4,226,135 A * 10/1980 Winter ................. 74/330
5,715,725 A    2/1998 Schnell et al.
5,715,727 A * 2/1998 Janiszewski ........... 74/325
5,906,132 A    5/1999 Janiszewski
6,638,197 B2  10/2003 Ogawa et al.
6,874,381 B2   4/2005 Berger et al.
7,044,013 B2   5/2006 Ahrens
7,155,994 B2 * 1/2007 Gumpoltsberger ....... 74/340

FOREIGN PATENT DOCUMENTS

| DE | 101 19 748 A1 | 10/2001 |
|---|---|---|
| DE | 102 23 226 A1 | 2/2003 |
| EP | 0 733 825 | 9/1996 |
| EP | 1 077 336 A1 | 2/2001 |
| EP | 1 077 336 B1 | 2/2001 |
| EP | 1 245 863 A2 | 10/2002 |
| JP | 11051125 A * | 2/1999 |
| WO | WO 03/038304 | 5/2003 |

* cited by examiner

Primary Examiner—Roger Pang

(57) ABSTRACT

A twin clutch transmission for a motor vehicle has two input shafts, two clutches, and driving shafts. The first input shaft can be actively connected to the first clutch, and the second input shaft can be actively connected to the second clutch. The first driving shaft is situated underneath the input shafts and the second driving shaft is situated above the input shafts, or vice versa. The input and driving shafts have intermeshing gear wheels, with fixed gears and loose wheels or idler gears. Each driving shaft has a gear wheel for transferring torque to the axle drive. A further shaft implements the reverse gear RG. A highly versatile and compact transmission is obtained by providing a third driving shaft that has a drive gear wheel for transferring torque to the axle drive, and the drive gear wheels of the driving shafts engage with an axle drive gear.

28 Claims, 2 Drawing Sheets

TWIN-CLUTCH TRANSMISSION FOR A MOTOR VEHICLE

CROSS-REFERENCE TO RELATED APPLICATIONS

This is a continuing application, under 35 U.S.C. § 120, of copending international application PCT/EP2005/000051, filed Jan. 6, 2005, which designated the United States; this application also claims the priority, under 35 U.S.C. § 119, of German patent application No. 10 2004 001 278.4, filed Jan. 7, 2004; the prior applications are herewith incorporated by reference in their entirety.

BACKGROUND OF THE INVENTION

Field of the Invention

The invention relates to a twin-clutch transmission for a motor vehicle. The twin-clutch transmission has two input shafts, two clutches and at least a first and a second driving shaft. The first input shaft is actively connectable to the first clutch and the second input shaft is actively connectable to the second clutch. The first driving shaft is arranged below and the second driving shaft is disposed above the input shafts (or vice versa). The input shafts and driving shafts have gearwheels in mesh with one another, and at least two gearwheels form a gear step. At least one gearwheel of a gear step is configured as an engageable and/or disengageable loose wheel and the other gearwheel is preferably configured as a fixed wheel. Each of the driving shafts has a driving gearwheel for transmitting a torque to the axle drive. A further shaft is provided for implementing the reverse gear.

Various motor vehicle transmissions, in particular twin-clutch transmissions for motor vehicles, are known in the prior art. German published patent application DE 101 19 748 A1, for instance, and its counterpart U.S. Pat. No. 6,874,381 B2 describe a twin-clutch transmission which has two input shafts that can be connected to a first and second clutch respectively. In addition to the two input shafts, two driving shafts which transmit the torque to the axle drive via driving gearwheels arranged on the driving shafts are provided above and below the input shafts. A further shaft arranged above the second driving shaft is provided for realizing the reverse gear. In this connection, the reverse gear is realized in such a way that—ultimately—the torque is transmitted from the first input shaft to the shaft for the reverse gear via a corresponding gearwheel pairing and then from here via the reverse gear gearwheel to the second driving shaft, from where the torque then acts on the axle drive via the driving gearwheel of this driving shaft.

Furthermore, a twin-clutch transmission wherein likewise two input shafts and two separate driving shafts mounted above and below the input shafts are provided is known in the prior art (cf. U.S. Pat. No. 6,638,197 B2 and DE 102 23 226 A1). The driving wheel of the axle drive is driven via the driving gearwheels of the driving shafts. For realizing the reverse gear, a further separate shaft which can be rotationally actively connected to the second input shaft via a corresponding gearwheel is provided within the transmission, the torque reversal then being transmitted to a driving shaft and from the driving gearwheel of this driving shaft to the axle drive.

The flexibility or type of construction of the prior art twin-clutch transmissions is greatly limited in particular on account of the realization of the reverse gear in the known twin-clutch transmissions, which are in some cases realized by means of a further shaft mounted between the driving shafts. This also prevents compact construction, in particular in the axial direction.

SUMMARY OF THE INVENTION

It is accordingly an object of the invention to provide a twin clutch transmission for a motor vehicle which overcomes the above-mentioned disadvantages of the heretofore-known devices and methods of this general type and which further improves the twin-clutch transmission in such a way that more flexible use is made possible and compact construction is achieved.

With the foregoing and other objects in view there is provided, in accordance with the invention, a twin-clutch transmission for a motor vehicle, comprising:

first and second input shafts, and first and second clutches;

the first input shaft being disposed for actively connecting to the first clutch and the second input shaft being disposed for actively connecting to the second clutch;

two driving shafts respectively disposed below and above the input shafts, the two driving shafts including a first driving shaft and second driving shaft;

the input shafts and the driving shafts having mutually intermeshing gearwheels, with at least two gearwheels respectively forming a gear step, and at least one gearwheel of a gear step being disposed as a selectively engageable and disengageable loose wheel and another gearwheel being mounted as a fixed wheel;

a third driving shaft for implementing a reverse gear of the transmission;

the first, second, and third driving shafts each having a driving gearwheel for transmitting a torque to an axle drive of the motor vehicle;

the axle drive having an axle driving wheel in meshing relationship with the driving gearwheels of the first, second, and third driving shafts; and a gearwheel for a seventh gear step of the transmission disposed on the second input shaft.

In other words, the above and other objects are achieved in that the further shaft is configured as a third driving shaft, that the third driving shaft has a driving gearwheel for transmitting torque to the axle drive and that the driving gearwheels of the driving shafts mesh with an axle driving wheel of the axle drive. By virtue of this way of realizing the reverse gear, a transmission of the "four shaft construction type" is now brought about for a twin-clutch transmission. As a result of this, the twin-clutch transmission can be constructed more compactly, in particular the axial dimensions can be reduced. Lastly, greater flexibility is afforded for such a twin-clutch transmission, with greater flexibility for the use of the transmission. In Particular, the twin-clutch transmission according to the invention now also has an additional seventh gear step (seven forward gears). It is therefore possible to produce a twin-clutch transmission with seven gear steps, that is with a very high number of gears, which has no negative effect on the axial length of the twin-clutch transmission, in particular in motor vehicles with a drive unit arranged transversely to the direction of travel. The possibility is thus afforded of being able correspondingly to insert a compact "seven gear transmission" into the standard construction space of a motor vehicle available between the longitudinal beams. A construction according to the invention is therefore provided wherein a "seven gear twin-clutch transmission" of multi-shaft construction type can be achieved in a very compact way by virtue of the specially coordinated position or arrangement of the input shafts, the driving shafts, but in particular the third driving shaft, and by virtue of the arrangement of the corresponding gearwheels of the individual gear steps. The result is that the disadvantages described in the introduction are avoided.

In accordance with an added feature of the invention, the first input shaft is embodied as a hollow shaft and the second input shaft is embodied as a solid shaft arranged inside the hollow shaft.

In accordance with an advantageous embodiment, the gearwheels for the second, fourth and sixth gear steps are arranged on the first input shaft. In a preferred modification, only one gearwheel is arranged on the first input shaft for the fourth and sixth gear steps. Further, the gearwheels of the first input shaft are designed as fixed wheels.

Similarly, the gearwheels for the first, third and fifth gear steps may be mounted to the second input shaft. In that case, the gearwheels of the second input shaft are designed as fixed wheels.

In accordance with a further feature of the invention, the gearwheels for the first, second, third and fourth gear steps are arranged on the first driving shaft. The gearwheels of the first driving shaft are preferably configured as loose wheels. In accordance with the further embodiment, the gearwheels for the fifth, sixth and seventh gear steps are arranged on the second driving shaft. The gearwheels of the second driving shaft may be loose wheels.

In accordance with another feature of the invention, an intermediate wheel for realizing the reverse gear RG is arranged on the second driving shaft. The intermediate wheel is preferably configured as a loose wheel and it may be formed as an intermediate wheel with stepped design having two different transmission steps.

Further advantageous modifications are as follows: The gearwheel for the reverse gear RG and/or a parking brake wheel are/is arranged on the third driving shaft. The gearwheel for the reverse gear RG is designed as a loose wheel. The gearwheel for the second gear step of the first input shaft, for the purpose of realizing the reverse gear RG, is also in mesh with the intermediate wheel of the second driving shaft.

There are provided a plurality of synchronizing devices for selectively engaging and disengaging the loose wheel gearwheels.

In a preferred implementation of the invention, the first synchronizing device is arranged between the gearwheels of the first and third gear steps of the first driving shaft. The second synchronizing device is arranged between the gearwheels of the second and fourth gear steps of the first driving shaft. The third synchronizing device is arranged between the gearwheels of the fifth and seventh gear steps of the second driving shaft. The fourth synchronizing device is arranged in the region of the gearwheel of the sixth gear step of the second driving shaft. The fifth synchronizing device is arranged in the region of the gearwheel for the reverse gear RG on the third driving shaft.

In an advantageous modification, the fourth and the fifth synchronizing devices are arranged to move in opposite directions, so that they can be operated by common actuation.

In accordance with again an additional feature of the invention, the center distances of the first or second input shaft from the first and second driving shafts are dimensioned in such a way that the synchronizing device for engaging the second or fourth gear step embodied as a sliding sleeve can be inserted under the spur gear toothing of the gearwheel of the second gear step when the second gear step has been engaged.

In accordance with again a furtherfeature of the invention, the center distances of the first or second input shaft from the first and second driving shafts are dimensioned in such a way that the synchronizing device for the sixth gear step embodied as a sliding sleeve can be inserted under the spur gear toothing of the intermediate wheel for the reverse gear when the reverse gear has been engaged.

The gearwheel that is configured as a loose wheel arranged on the third driving shaft has a clearance between its wheel body/its spur gear toothing and its coupling toothing, such that the intermediate wheel can be dimensioned appropriately.

In accordance with a concomitant feature of the invention, the driving gearwheels each have different numbers of teeth.

Other features which are considered as characteristic for the invention are set forth in the appended claims.

Although the invention is illustrated and described herein as embodied in a twin-clutch transmission for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
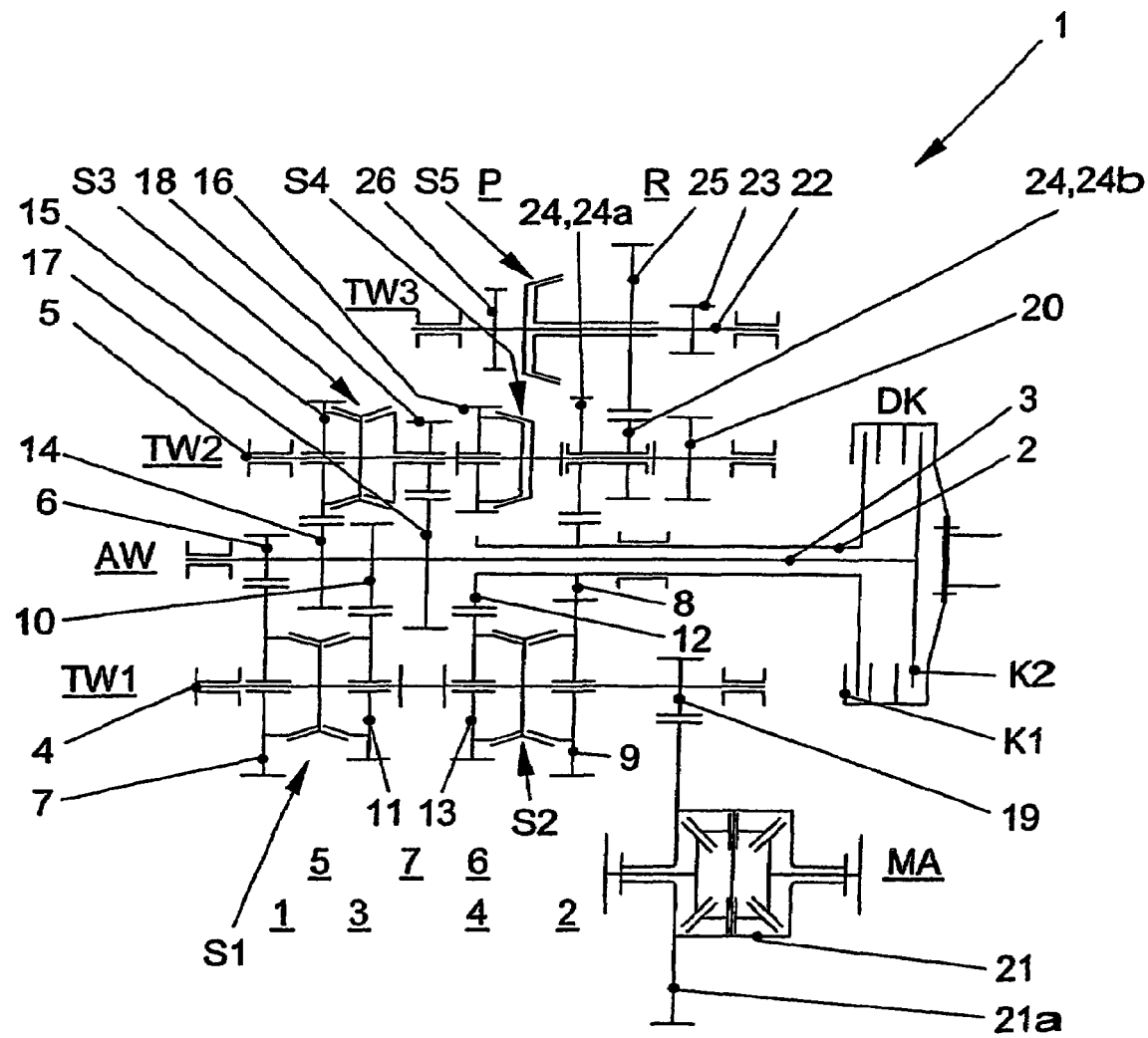
FIG. 1 is a diagram of the essential components of the twin-clutch transmission according to the invention.

Referring now to the figures of the drawing in detail, at least a part of a twin-clutch transmission 1 for a motor vehicle is shown. The motor vehicle itself is not illustrated. The twin-clutch transmission 1 has two input shafts 2 and 3, two clutches K1 and K2 and a first and second driving shaft 4 and 5. The first input shaft 2 can be connected actively to the first clutch K1, the second input shaft 3 being actively connectable to the second clutch K2. Here, the first driving shaft 4 (TW1) is preferably arranged below the input shafts 2 and 3. The second driving shaft 5 (TW2) is arranged above the input shafts 2 and 3. It will be readily understood by those skilled in the pertinent art that this can also be the other way round. The input shafts 2 and 3 and the driving shafts 4 and 5 have gearwheels 6 to 18 in mesh with one another. At least two gearwheels form a gear step in each case, which will be explained in greater detail below. In this connection, at least one gearwheel of a gear step is designed as an engageable and/or disengageable loose wheel, and the other gearwheel is preferably designed as a fixed wheel. Each driving shaft 4 and 5 has a driving gearwheel 19 and 20 for transmitting torque to the axle drive 21. A further shaft 22 (TW3) is provided for implementing the reverse gear RG.

The disadvantages described in the introduction are now avoided by virtue of the fact that the further shaft 22 is designed as a third driving shaft 22, that the third driving shaft 22 has a driving gearwheel 23 for transmitting torque to the axle drive 21, and that the driving gearwheels 19, 20 and 23 of the driving shafts 4, 5 and 22 are in mesh with an axle driving wheel 21a of the axle drive 21. The driving gearwheels 19, 20 and 23 of the driving shafts 4, 5 and 22 preferably lie in one and the same plane, namely in the plane of the axle driving wheel 21a. By virtue of the design of the further shaft as a third driving shaft 22 for realizing the reverse gear RG, a twin-clutch transmission 1 of very compact construction in the axial direction can be produced. It is now no longer necessary—as previously usual in the prior art—to provide the further shaft in the region between the first driving shaft 4 and the second driving shaft 5. With this, the twin-clutch transmission 1 according to the invention is designed as a transmission of the "four shaft construction type".

The following may first be stated before the further preferred embodiment of the twin-clutch transmission 1 is described in greater detail below: the individual gear steps of the twin-clutch transmission 1 are now formed as follows by the following gearwheels. The first gear step is formed by the gearwheels 6 and 7, the second gear step by the gearwheels 8 and 9, the third gear step by the gearwheels 10 and 11, the fourth gear step by the gearwheels 12 and 13, the fifth gear step by the gearwheels 14 and 15 and the sixth gear step by the gearwheels 12 and 16. Here, the twin-clutch transmission 1 according to the invention has an additional seventh gear step, which is formed by the gearwheels 17 and 18.

FIG. 1 shows that the first input shaft 2 is designed as a hollow shaft and the second input shaft 3 is embodied as a solid shaft substantially arranged in the first input shaft 2 designed as a hollow shaft.

The gearwheels for the second, fourth and sixth gear steps arranged on the first input shaft 2, that is the gearwheels 8 and 12, are preferably designed as fixed wheels, that is they are not engageable or disengageable. In this connection, the gearwheel 12 arranged on the first input shaft 2 is provided for the fourth and sixth gear steps. In other words, the fourth and sixth gear steps have a common gearwheel 12.

The gearwheels 6, 10 and 14 for the first, third and fifth gear steps are arranged on the second input shaft 3. In this connection, a gearwheel 17 for a seventh gear step is additionally arranged on the second input shaft 3. In this connection, the gearwheels 6, 10, 14 and 17 of the second input shaft 3 are preferably designed as fixed wheels.

The gearwheels 7, 9, 11 and 13 for the first, the second, the third and the fourth gear steps are arranged on the first driving shaft 4. In this connection, these gearwheels 7, 9, 11 and 13 are preferably designed as loose wheels.

The gearwheels 15, 16 and 18 for the fifth, sixth and seventh gear step are arranged on the second driving shaft 5. In this connection, these gearwheels 15, 16 and 18 of the second driving shaft 5 are preferably designed as loose wheels. An intermediate wheel 24 is designed or arranged as a loose wheel on the second driving shaft 5. In this connection, this intermediate wheel 24 is of step-like design and has two different transmission steps 24a and 24b.

The gearwheel 25 for the reverse gear RG and/or a parking brake wheel 26 is arranged on the third driving shaft 22. The gearwheel 25 for the reverse gear RG is preferably designed as a loose wheel here. To realize the reverse gear RG, the gearwheel 8 of the second gear step of the first input shaft 2 is also in mesh with the intermediate wheel 24, in particular the transmission step 24a, of the second driving shaft 5. Furthermore, the other transmission step 24b of the intermediate wheel 24 is in mesh with the gearwheel 25.

For engaging and/or disengaging the gearwheels designed as loose wheels, a number of synchronizing devices S1 to S5 are provided. The first synchronizing device S1 is arranged between the gearwheels 7 and 11 of the first and third gear steps of the first driving shaft 4. The second synchronizing device S2 is arranged between the gearwheels 9 and 13 of the second and fourth gear steps of the first driving shaft 4. The third synchronizing device S3 is arranged between the gearwheels 15 and 18 of the fifth and seventh gear steps of the second driving shaft 5. The fourth synchronizing device S4 is arranged in the region of the gearwheel 16 of the sixth gear step of the second driving shaft 5. Lastly, the fifth synchronizing device S5 is arranged in the region of the gearwheel 25 for the reverse gear RG on the third driving shaft 22.

The fourth and the fifth synchronizing devices S4 and S5 are arranged "to move in opposite directions", so that they can be operated by common actuation. This can be seen clearly from FIG. 1 as the corresponding synchronizing devices S4 and S5 lie virtually "in a plane".

Designing the further shaft for realizing the reverse gear as a third driving shaft 22 allows the overall axial length of the twin-clutch transmission 1 to be shortened and yet the flexibility of the twin-clutch transmission 1 to be increased, in particular a further gear, namely a seventh gear step, to be provided, which is now correspondingly realized within the space available, here preferably located between the gearwheels of the third and sixth gear steps. A very compact twin-clutch transmission 1 is realized here by virtue of the correspondingly coordinated location/positioning of the individual shafts and the arrangement of the individual gearwheels, great variation possibilities for gear stepping and thus an optimum spread of coordinatable driving performances being ensured at the same time, in particular also by virtue of the design of the intermediate wheel 24 with the two transmission steps 24a and 24b. In particular, the twin-clutch transmission 1 according to the invention illustrated here has seven forward gears altogether, that is in total seven gear steps and a reverse gear RG. In this connection, the third driving shaft 22 is arranged above the second driving shaft 5. A very large amount of construction space can be saved by virtue of appropriate arrangement/distribution of the gear steps, in particular also by virtue of the fourth and sixth gear steps having a common intermediate wheel 12.

All the toothings of the three driving shafts 4, 5 and 22 are coordinated with one another in relation to the axle driving wheel 21a.

Here, the reverse gear RG is assigned to the clutch K1 which can be connected actively to the first input shaft 2. The first and second input shafts 2 and 3 are preferably in each case mounted with an axially independent locating/non-locating bearing arrangement. In this connection, the locating bearings are preferably in the form of deep-groove ball bearings, each locating bearing in each case being assigned to a housing part. The second input shaft 3 is preferably provided with a coaxial bore with a corresponding radial branch for lubricating the radial rotary shaft seal between the two input shafts 2 and 3. The sliding selector shaft for the sixth gear step or for the reverse gear is preferably at the same time embodied as a ratchet bearing arrangement for the parking brake and interacts with the parking brake wheel 26. Lastly, the gearwheel 25 for realizing the reverse gear RG is not only preferably in the form of a loose wheel and mounted on the third driving shaft 22 but also designed with a clearance between the gearwheel body and the coupling body of the synchronizing device S5, in order that optimum design of the intermediate wheel 24 on the second driving shaft 5 is possible.

The center distances between the "drive shafts", that is between the first or second input shaft 2 or 3, and the individual driving shafts, namely in particular the first and second driving shafts 4 and 5, are preferably dimensioned in such a way in relation to one another that the sliding sleeve of the synchronizing device S2 can be displaced under the spur gear toothing of the gearwheel 9 of the second gear step when the second gear step has been engaged, in other words can "be inserted" here. In this connection, the word "inserted" means at least partial radial overlapping or covering of the sliding sleeve of the synchronizing device S2 by the spur gear toothing of the gearwheel 9. Similar also applies for the sliding sleeve of the synchronizing device S4 for the sixth gear step, which can be inserted correspondingly under the spur gear toothing of the intermediate wheel 24a when the reverse gear has been engaged. Furthermore, the gearwheel 25 arranged on the third driving shaft 22 has a given clearance between its wheel body or its spur gear toothing and its coupling toothing, so that the intermediate wheel 24a can be dimensioned optimally. Furthermore, the driving gearwheels 19, 20 and 23 are made in such a way that they have different numbers of teeth.

Figure 2:
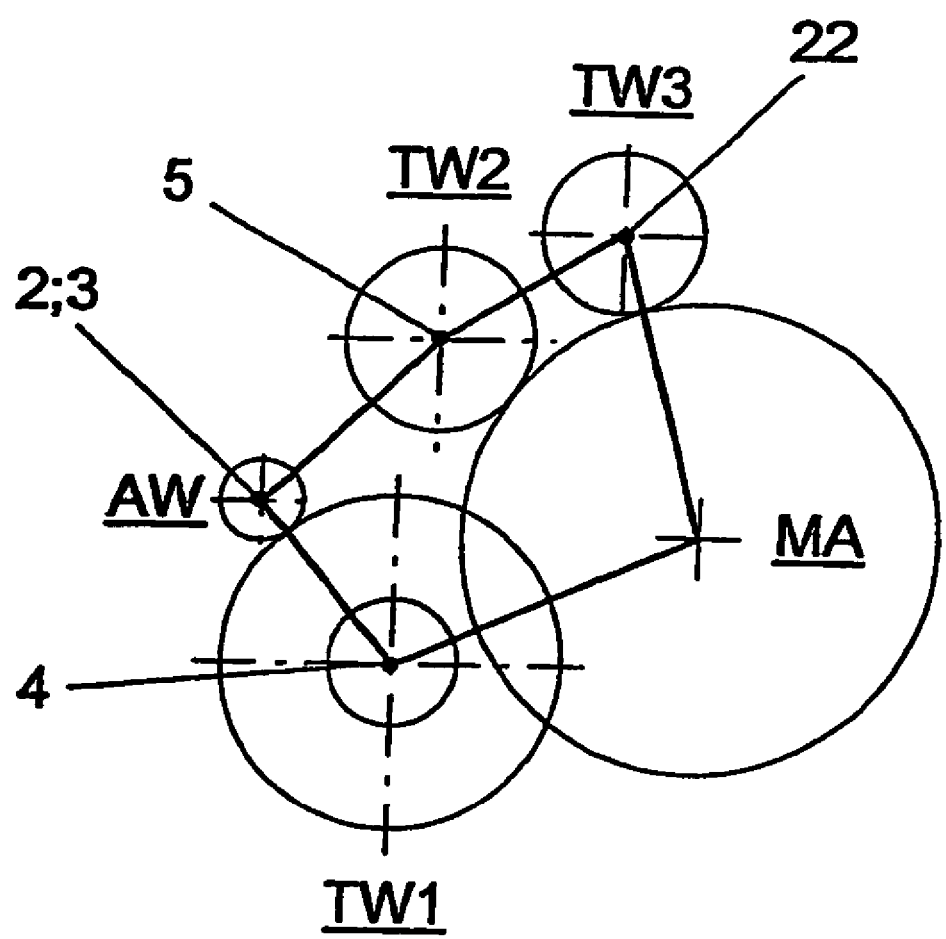
FIG. 2 is a diagram of a side view illustrating the arrangement/positioning of the individual shafts of the twin-clutch transmission according to the invention as it is illustrated in FIG. 1.

Other components of the twin-clutch transmission 1 are not illustrated here, for example hydraulic lines or a transmission control unit which controls the corresponding synchronizing devices S1 to S5. The twin-clutch transmission 1 illustrated here is preferably used as an automated transmission. In this connection, for the hydraulic control of the twin-clutch transmission 1, two separate hydraulic control circuits are preferably formed, for the synchronizing devices S1 and S3 and for S2, S4 and S5. An axially very compact twin-clutch transmission 1 is provided, which avoids the disadvantages described in the introduction and achieves corresponding advantages, in particular by virtue of the coordination of the gearwheels, driving shafts and input shafts and the positioning of the individual gearwheels on the shafts and the positioning of the shafts in relation to one another, which is illustrated clearly in FIG. 2.

We claim:

1. A twin-clutch transmission for a motor vehicle, comprising:
   first and second input shafts, and first and second clutches;
   said first input shaft forming an outer input shaft and said second input shaft forming an inner input shaft disposed coaxially inside said outer input shaft;
   said first input shaft being disposed for actively connecting to said first clutch and said second input shaft being disposed for actively connecting to said second clutch;
   two driving shafts respectively disposed below and above said input shafts, said two driving shafts including a first driving shaft and second driving shaft;
   said input shafts and said driving shafts having mutually intermeshing gearwheels, with at least two gearwheels respectively forming a gear step, and at least one gearwheel of a gear step being disposed as a selectively engageable and disengageable loose wheel and another gearwheel being mounted as a fixed wheel;
   said first and second input shaft each carrying a plurality of gearwheels defining first, second, third, fourth, fifth, and sixth gear steps of the transmission, and said inner input shaft carrying a further gearwheel for a seventh gear step of the transmission;
   a third driving shaft for implementing a reverse gear of the transmission;
   said first, second, and third driving shafts each having a driving gearwheel for transmitting a torque to an axle drive of the motor vehicle;
   the axle drive having an axle driving wheel in meshing relationship with said driving gearwheels of said first, second, and third driving shafts.

2. The twin-clutch transmission according to claim 1, wherein said first input shaft is a hollow shaft and said second input shaft is a solid shaft disposed in said hollow shaft.

3. The twin-clutch transmission according to claim 2, wherein gearwheels for a second, a fourth, and a sixth gear step are disposed on said first input shaft.

4. The twin-clutch transmission according to claim 2, wherein a single gearwheel is disposed on said first input shaft for the fourth and sixth gear steps.

5. The twin-clutch transmission according to claim 3, wherein said gearwheels of said first input shaft are fixed wheels.

6. The twin-clutch transmission according to claim 2, wherein gearwheels for a first, a third, and a fifth gear step are disposed on said second input shaft.

7. The twin-clutch transmission according to claim 6, wherein said gearwheels on said second input shaft are fixed wheels.

8. The twin-clutch transmission according to claim 2, wherein gearwheels for a first, a second, a third, and a fourth gear step are disposed on said first driving shaft.

9. The twin-clutch transmission according to claim 8, wherein said gearwheels of said first driving shaft are loose wheels.

10. The twin-clutch transmission according to claim 2, wherein gearwheels for a fifth, a sixth, and the seventh gear step are disposed on said second driving shaft.

11. The twin-clutch transmission according to claim 10, wherein said gearwheels of said second driving shaft are loose wheels.

12. The twin-clutch transmission according to claim 1, which further comprises an intermediate wheel for a reverse gear mounted on said second driving shaft.

13. The twin-clutch transmission according to claim 12, wherein said intermediate wheel is a loose wheel.

14. The twin-clutch transmission according to claim 12, wherein said intermediate wheel is a stepped wheel with two different transmission steps.

15. The twin-clutch transmission according to claim 1, wherein said third driving shaft carries at least one of a gearwheel for a reverse gear and a parking brake wheel.

16. The twin-clutch transmission according to claim 15, wherein said gearwheel for the reverse gear is a loose wheel.

17. The twin-clutch transmission according to claim 12, wherein said gearwheel for the second gear step of said first input shaft is disposed to also mesh with said intermediate wheel on said second driving shaft for implementing the reverse gear.

18. The twin-clutch transmission according to claim 1, wherein said driving gearwheels have mutually different numbers of teeth.

19. The twin-clutch transmission according to claim 1, which comprises a plurality of synchronizing devices disposed to selectively engage and disengage said gearwheels designed as loose wheels.

20. The twin-clutch transmission according to claim 19, wherein said plurality of synchronizing devices includes a first synchronizing device arranged between the gearwheels of the first and third gear steps on said first driving shaft.

21. The twin-clutch transmission according to claim 19, wherein said plurality of synchronizing devices includes a second synchronizing device arranged between the gearwheels of the second and fourth gear steps on said first driving shaft.

22. The twin-clutch transmission according to claim 19, wherein said plurality of synchronizing devices includes a third synchronizing device arranged between the gearwheels of the fifth and seventh gear steps on said second driving shaft.

23. The twin-clutch transmission according to claim 19, wherein said plurality of synchronizing devices includes a fourth synchronizing device arranged in a region of the gearwheel of the sixth gear step of said second driving shaft.

24. The twin-clutch transmission according to claim 19, wherein said plurality of synchronizing devices includes a fifth synchronizing device arranged in a region of a gearwheel for the reverse gear on said third driving shaft.

25. The twin-clutch transmission according to claim 19, wherein said plurality of synchronizing devices includes fourth and fifth synchronizing devices disposed to move in mutually opposite directions for operation by common actuation.

26. The twin-clutch transmission according to claim 19, wherein center distances of said first or second input shaft from said first and second driving shafts are dimensioned such that a synchronizing device for engaging the second or fourth gear step embodied as a sliding sleeve is insertible under a spur gear toothing of the gearwheel of the second gear step when the second gear step has been engaged.

27. The twin-clutch transmission according to claim 19, wherein said gearwheel on said third driving shaft is a loose wheel formed with a clearance between a wheel body of a spur gear toothing thereof and a coupling toothing thereof, to allow an intermediate wheel for the reverse gear to be dimensioned appropriately.

28. A twin-clutch transmission for a motor vehicle, comprising:
   first and second input shafts, and first and second clutches;
   said first input shaft being disposed for actively connecting to said first clutch and said second input shaft being disposed for actively connecting to said second clutch;
   two driving shafts respectively disposed below and above said input shafts, said two driving shafts including a first driving shaft and second driving shaft;
   said input shafts and said driving shafts having mutually intermeshing gearwheels, with at least two gearwheels respectively forming a gear step, and at least one gearwheel of a gear step being disposed as a selectively engageable and disengageable loose wheel and another gearwheel being mounted as a fixed wheel;
   a third driving shaft for implementing a reverse gear of the transmission;
   said first, second, and third driving shafts each having a driving gearwheel for transmitting a torque to an axle drive of the motor vehicle;
   the axle drive having an axle driving wheel in meshing relationship with said driving gearwheels of said first, second, and third driving shafts; and
   a gearwheel for a seventh gear step of the transmission disposed on said second input shaft;
   a plurality of synchronizing devices disposed to selectively engage and disengage said gearwheels designed as loose wheels; and
   wherein center distances of said first or second input shaft from said first and second driving shafts are dimensioned such that the synchronizing device for engaging the sixth gear step embodied as a sliding sleeve is insertible under a spur gear toothing of an intermediate wheel for the reverse gear when the reverse gear has been engaged.

* * * * *